United States Patent
Kreienheder

(10) Patent No.: US 9,211,878 B2
(45) Date of Patent: Dec. 15, 2015

(54) IN SITU FLAP AND SLAT WING TIP BRAKE RESPONSE TESTER

(71) Applicant: HAMILTON SUNDSTRAND CORPORATION, Windsor Locks, CT (US)

(72) Inventor: Jason B. Kreienheder, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 468 days.

(21) Appl. No.: 13/786,546

(22) Filed: Mar. 6, 2013

(65) Prior Publication Data

US 2014/0257713 A1 Sep. 11, 2014

(51) Int. Cl.
| | |
|---|---|
| G06F 19/00 | (2011.01) |
| B60T 17/22 | (2006.01) |
| B60T 1/16 | (2006.01) |
| B64C 9/32 | (2006.01) |
| B64F 5/00 | (2006.01) |

(52) U.S. Cl.
CPC ............. *B60T 17/221* (2013.01); *B60T 1/16* (2013.01); *B64C 9/323* (2013.01); *B64F 5/0045* (2013.01)

(58) Field of Classification Search
CPC ...... B60T 17/221; B60T 8/17616; B60T 1/16
USPC ............................. 702/44, 117, 118, 182–185
See application file for complete search history.

(56) References Cited

U.S. PATENT DOCUMENTS 6,182,001 B1 * 1/2001 Sugai et al. .................... 701/78

* cited by examiner

*Primary Examiner* — Edward Raymond
(74) *Attorney, Agent, or Firm* — Cantor Colburn LLP

(57) ABSTRACT

A method, apparatus and computer-readable medium for measuring a determining a validity of an estimate of a response time of a brake is disclosed. A sensor obtains a waveform of a parameter related to the engagement of the brake during engagement of the brake. A processor analyzes the obtained waveform, determines inflection points in the waveform within a selected time period, validates the signal integrity of the waveform and provides an indicator when the number of determined inflection points is greater than a pre-specified count value.

20 Claims, 4 Drawing Sheets

IN SITU FLAP AND SLAT WING TIP BRAKE RESPONSE TESTER

BACKGROUND

The present disclosure relates to aircraft brake testing and, more specifically, to measuring brake response times.

Regional aircrafts, such as the CRJ-700, CRJ-900 and CRJ-1000 jets, rely on wingtip brakes which include a spring-applied solenoid-released device to slow the aircraft. In normal operation, these wingtip brakes are to be engaged simultaneously to prevent asymmetrical flight control surfaces in the aircraft. Two events in applying the brakes are of importance for proper braking. The first event occurs when the solenoid is de-energized to release the brake from its disengaged position, thereby initiating engagement of the brake. The second event occurs when the brake consequently becomes full engaged in the braking position. The response time between initiating engagement of the brake and when the brake reaches the fully engaged position is an important parameter in the safety of the aircraft. A test is often employed to verify that the response time is within specified limits by measuring a parameter that is indicative of the brake engagement process.

SUMMARY

According to one embodiment of the present disclosure, a method of determining a validity of an estimate of a response time of a brake includes: performing an action that initiates engagement of the brake; obtaining a waveform of a parameter related to the engagement of the brake; determining inflection points in the waveform within a selected time period to estimate the response time of the brake; and providing an indicator when a number of determined inflections points is greater than a selected count value to indicate the validity of the of the estimate.

According to another embodiment, an apparatus for determining a validity of an estimate of a response time of a brake includes: a sensor configured to obtain measurements of a parameter related to the engagement of the brake; a processor configured to: obtain a waveform of the parameter from the obtained parameter measurements, determine inflection points in the waveform within a selected time period to estimate the response time of the brake, and provide an indicator when a number of determined inflection points is greater than a selected count value related to the validity of the estimated response time.

According to another embodiment, a computer program product includes a computer readable storage medium having computer readable program code embodied therewith, the computer readable program code comprising instructions, that when executed by a computer, implement a method of determining a validity of an estimate of a response time of an aircraft brake, wherein the method including: performing an action that initiates engagement of the brake; obtaining a waveform of a parameter related to the engagement of the brake; determining inflection points in the waveform within a selected time period to estimate the response time of the brake; and providing an indicator when a number of determined inflection points is greater than a selected count value to indicate the validity of the estimate.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

As described above, it is generally known to perform a test to verify that the brake engagement process response time is within specified limits. In some cases, however, such tests and the measurement of the parameter utilized in those tests may be susceptible to error due to fluctuations in the parameter measurements that make it difficult to determine response time.

Figure 1:
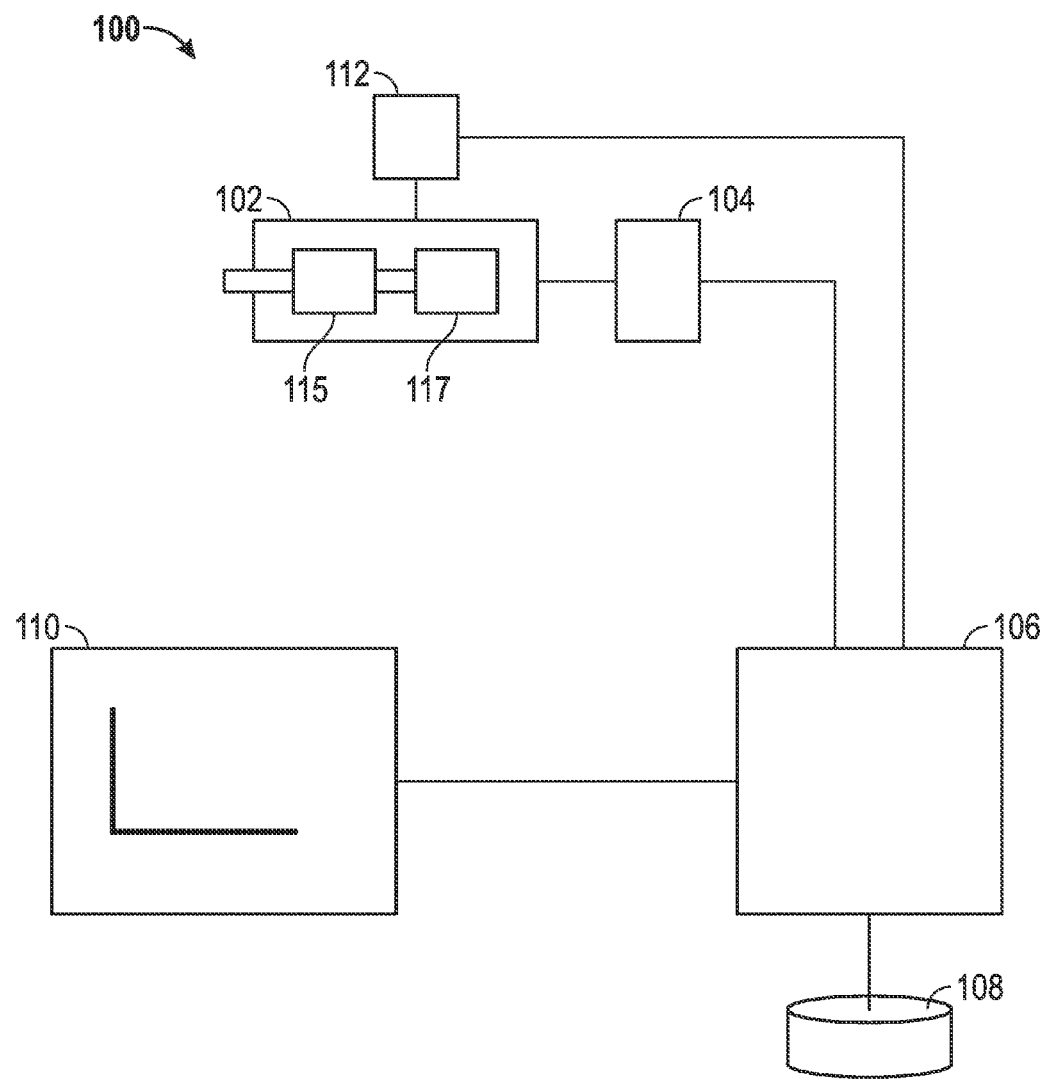
FIG. 1 shows a system for testing a brake of an aircraft in an exemplary embodiment of the present invention.

FIG. 1 shows a system 100 for testing a brake 102 of an aircraft in an exemplary embodiment of the present invention. In various embodiments, the brake 102 may be tested in-situ, i.e., without removing or disconnecting the brake 102 from the aircraft. Alternately, the brake 102 may be removed from the aircraft and tested separately. The brake 102 may include a solenoid or electromagnet 117 and a spring 115 that are used to position the brake 102 in one of a disengaged position (i.e., a non-braking position) and a fully engaged position (i.e., a braking position). The exemplary test system 100 includes a sensor 104 coupled to the brake 102. The sensor 104 may be configured to obtain one or more measurements of a parameter related to engagement of the brake 102, i.e., a parameter that changes based on the state of the brake 102. In an exemplary embodiment, the parameter related to engagement of the brake 102 is voltage. However, other parameters such as current, acoustics, etc. may be measured in alternate embodiments. The sensor 104 may be coupled to a processor 106 that may obtain or receive the parameter measurements from the sensor 104, store the parameter measurements and perform various calculations using the stored parameter measurements to determine a response time of the aircraft brake 102. In an exemplary embodiment, the processor 106 may store the parameter measurements and calculations to a suitable storage medium 108, such as a physical memory location. In an alternate embodiment, the processor 106 may also or alternatively display the parameter measurements and/or results of the calculations to a display or monitor 110. The system may further include a device 112 for activating the brake 102 or initiating engagement of the brake 102 for testing purposes by de-energizing the solenoid 117.

In an exemplary test, the sensor 104 and the brake-activation device 112 are coupled to the brake 102. In an exemplary embodiment, the sensor 104 may be operated to obtain parameter measurements at a suitable sampling frequency such as about 1 kHz. Additionally, the sensor 104 may measure the parameter for a suitable time period, i.e., a time period that is greater than an expected response time of the brake. An exemplary time period may be about 2 seconds. The sensor 104 may then send the obtained parameter measurements to the processor 106 for processing. In various embodiments, the brake 102 may be held in a disengaged position by the solenoid or electromagnet 117 and the spring 115. The test system 100 may include switches to initiate the test and de-energize the solenoid via the brake-activation device 112. When the brake-activation device 112 de-energizes the solenoid 117, the brake 102 is biased toward an engaged position by a spring force provided by the spring 115 and reaches the engaged position after a response time after the solenoid or electromagnet 117 has been de-energized. The parameter (i.e., voltage) changes when de-energizing the solenoid 117 and as the brake moves into the fully engaged position. Inflection points in the voltage occur when the solenoid or electromagnet 117 is turned off and when the brake becomes fully engaged. Thus, the test system 100 determines when these inflection points occur and thereby determines the response time as the time difference between these inflection points.

Figure 2:
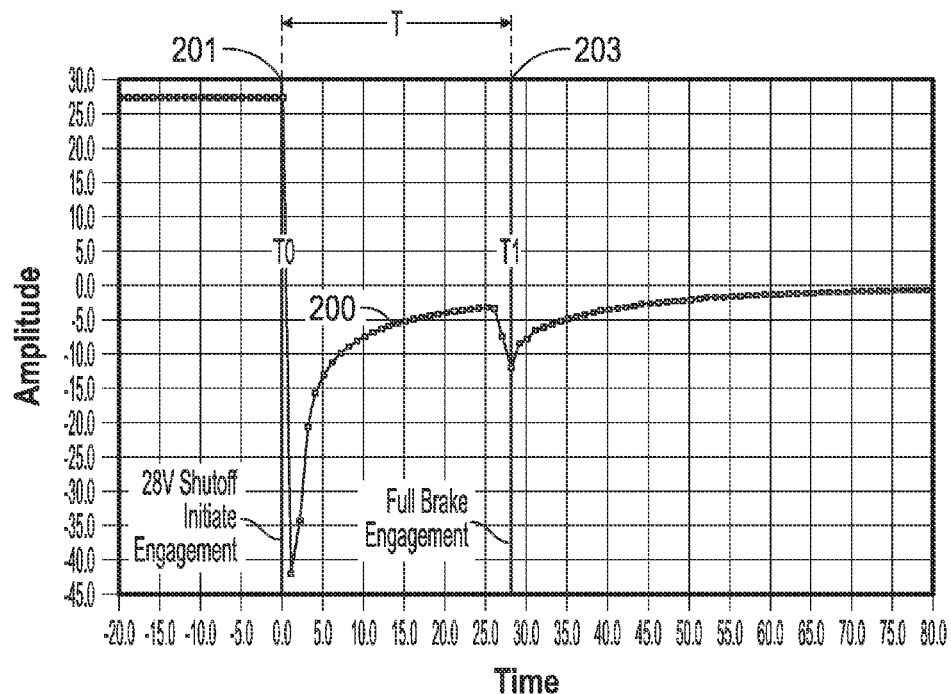
FIG. 2 shows an exemplary voltage curve or waveform obtained during a brake test.

FIG. 2 shows an exemplary voltage curve 200 or waveform obtained during a brake test. Time is measured along the x-axis in milliseconds (msecs) and voltage is measured along the y-axis in volts. At time t=0 an inflection 201 in the voltage curve 200 occurs as the solenoid or electromagnetic is de-energized to initiate engagement of the brake 102. The full engagement of the brake 102 is indicated by the voltage inflection 203 at about 28 msecs. In one embodiment, the processor 106 may determine the voltage inflections 201 and 203 by determining a first derivative of the voltage curve 200 with respect to time and comparing the first derivatives to a selected threshold value. First derivate values that exceed the selected threshold value may be recorded by the processor 106 and the time differences between these inflection points may be used to determine response time. In FIG. 2, there are two inflections 201 and 203 in the voltage parameter indicative of a response time of the brake. The first derivatives of these inflections 201 and 203 may exceed the selected threshold value, thereby indicating their relevance to the braking operation. The processor 106 may determine the first inflection point 201 as indicative of initiating engagement of the brake 102 and determine the second inflection point 203 as indicative of full engagement of the brake 102. The processor 106 may therefore determine the response time T as the time difference between inflection points 201 and 203.

Figure 3:
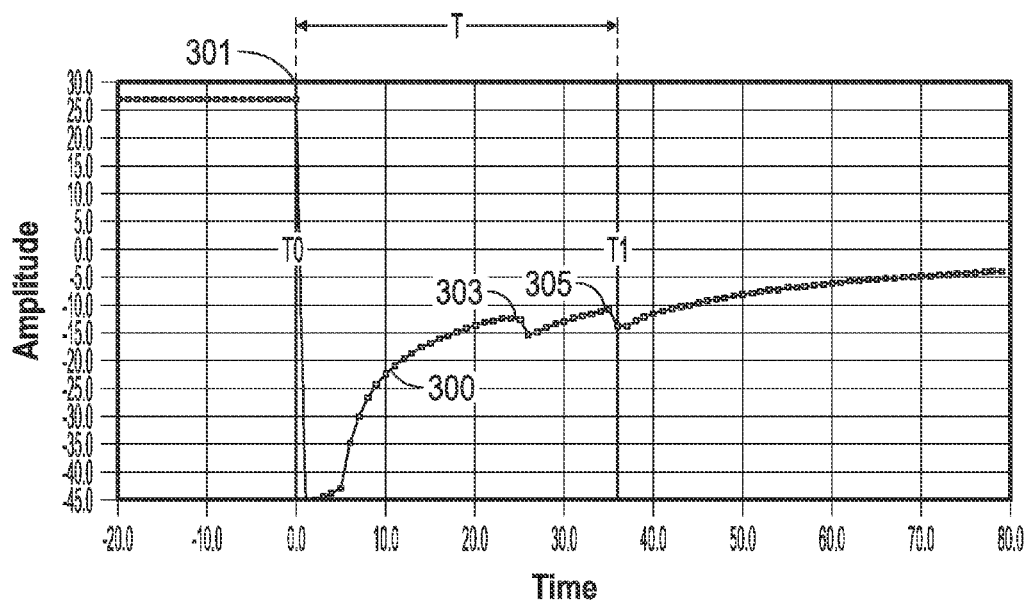
FIG. 3 shows another voltage curve or waveform obtained during an exemplary brake test.

FIG. 3 shows another voltage curve 300 or waveform obtained during an exemplary brake test. Time is measured along the x-axis in msecs and voltage is measured along the y-axis in volts. Voltage curve 300 displays an inflection point 301 in the parameter at time t=0 and two subsequent inflection points 303 and 305 at times of about 25 msecs and about 35 msecs, respectively. While one of the inflection points 303 and 305 may be indicative of the full engagement of the brake, the other of the inflections points 303 and 305 may be an artifact. The processor 106 may determine the first inflection point 301 within the sampling period and assign this inflection point 301 to indicate an initiation of engagement of the brake 102. The processor 106 is configured to select the last inflection point 305 of the sample period as indicative of the full engagement of the brake 102 and to determine the response time as the time difference between the last inflection point 305 and the first inflection point 301. The processor 106 is further configured to count the number of inflection points occurring within the sampling period. When the number of inflections points within the sampling period is greater than a pre-selected count value, the sampling of the parameter may be considered to be too noisy or to be not acceptable (i.e., the resulting estimate of brake response time invalid). When the number of inflection points within the sampling period is less than the pre-selected count value, the resulting estimate of brake response time may be considered valid. Therefore, when the counted number of inflection points is greater than the pre-selected count value, the processor 106 may produce an indicator indicating a request to discard the measurements or the results of the calculations (i.e, the estimated brake response time) or indicating a need to repeat the test. Similarly, an indicator may be produced to indicate that the estimate is acceptable or valid. The produced signal may be a signal sent to an electrical device or may be one or more lights to be viewed by an operator.

Figure 4:
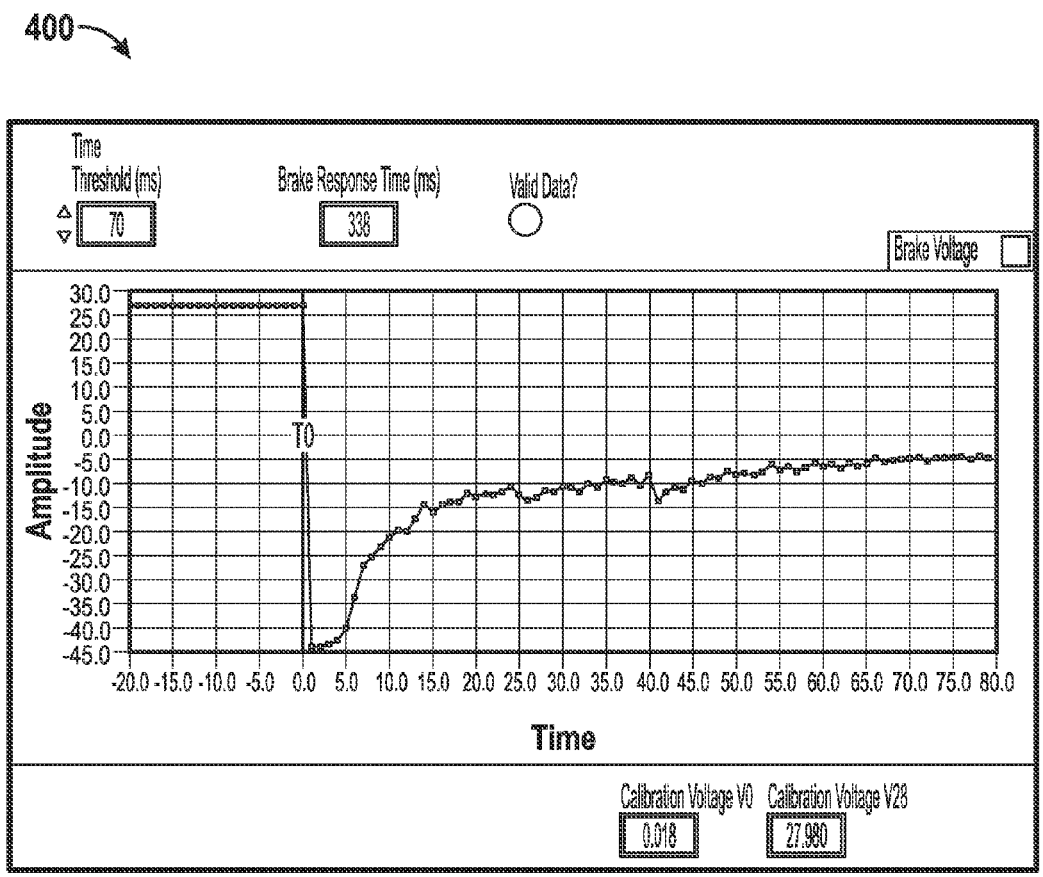
FIG. 4 shows a voltage curve that may be considered unacceptable due to the signal integrity of the voltage parameter and a number of inflection points determined.

FIG. 4 shows a voltage curve 400 that may be considered unacceptable due to the signal integrity of the voltage parameter and the number of inflection points determined by the processor 106.

Figure 5:
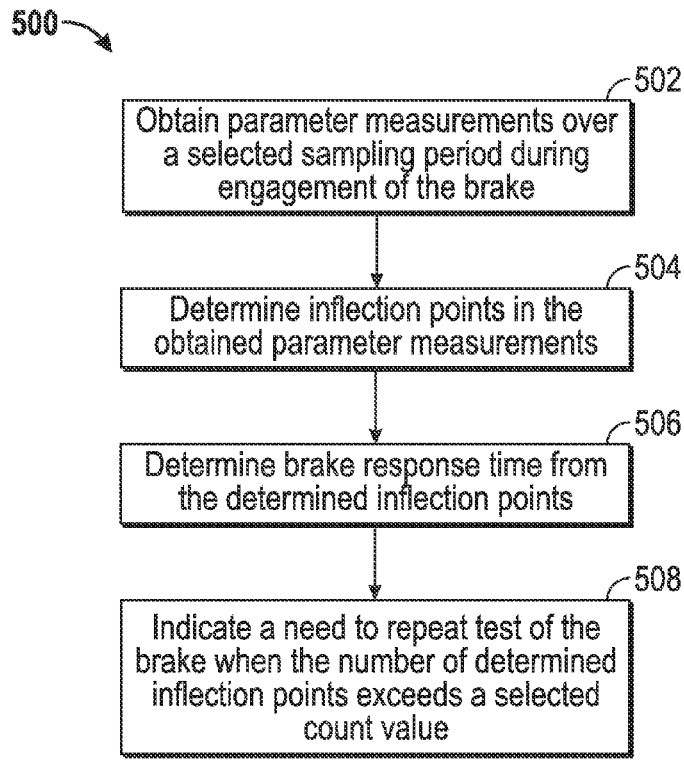
FIG. 5 shows a flowchart illustrating a method of testing an aircraft brake according to an exemplary embodiment.

FIG. 5 shows a flowchart 500 illustrating a method of testing an aircraft brake according to an exemplary embodiment. In Block 502, a sensor obtains a parameter measurement of the brake 102 at a selected frequency for a selected sampling time. During this selected sampling time, the solenoid or electromagnet 117 is de-energized, thereby initiating engagement of the brake 102, and the brake 102 becomes fully engaged in the braking position. In Block 504, the processor determines inflection points in the parameter measurements collected over the sampling period. In block 506, the inflection points are compared to a selected threshold value and those inflections points that exceed the selected threshold value are used to determine a response time of the brake. In Block 508, the number of inflection points is determined and compared to a selected count value. When the number of inflection points exceeds the selected count value, an indicator is produced to indicate a need to repeat the test of the aircraft brake (i.e., an invalid estimate of brake response time has occurred). Alternately, an indicator may be produced to indicate a valid test when the number of inflection points is less than the selected count value.

Figure 6:
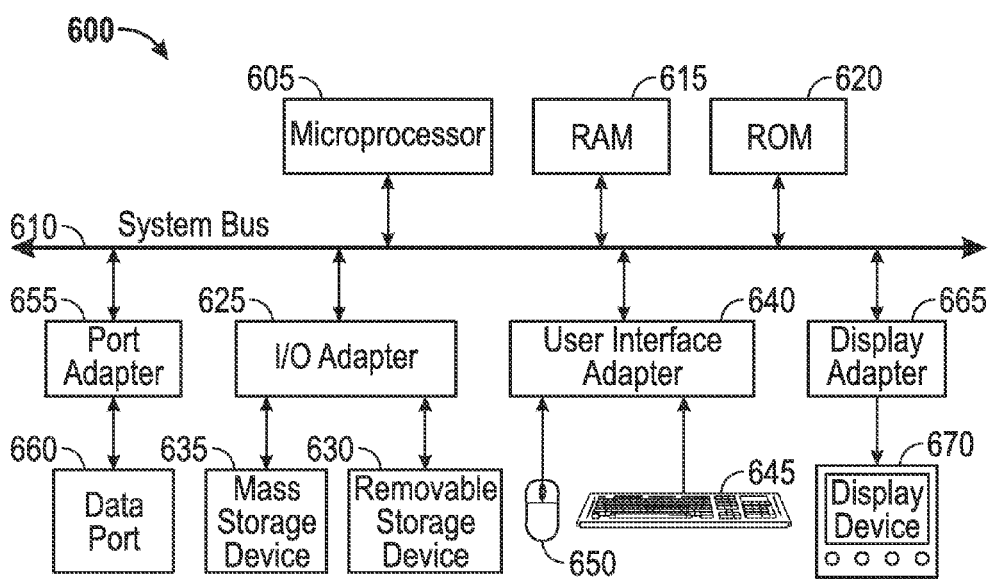
FIG. 6 is a schematic block diagram of a general-purpose computing system suitable for practicing embodiments of the present invention.

Generally, the method embodiments for implementing systematic, variation-aware integrated circuit extraction may be practiced with a general-purpose computer and the method may be coded as a set of instructions on removable or hard media for use by the general-purpose computer. FIG. 6 is a schematic block diagram of a general-purpose computing system suitable for practicing embodiments of the present invention. In FIG. 6, computing system 600 has at least one microprocessor or central processing unit (CPU) 605. CPU 605 is interconnected via a system bus 610 to a random access memory (RAM) 615, a read-only memory (ROM) 620, an input/output (I/O) adapter 625 for a connecting a removable data and/or program storage device 630 and a mass data and/or program storage device 635, a user interface adapter 640 for connecting a keyboard 645 and a mouse 650, a port adapter 655 for connecting a data port 660 and a display adapter 665 for connecting a display device 670.

ROM 620 contains the basic operating system for computing system 600. The operating system may alternatively reside in RAM 615 or elsewhere as is known in the art. Examples of removable data and/or program storage device 630 include magnetic media such as floppy drives and tape drives and optical media such as CD ROM drives. Examples of mass data and/or program storage device 635 include hard disk drives and non-volatile memory such as flash memory. In addition to keyboard 645 and mouse 650, other user input devices such as trackballs, writing tablets, pressure pads, microphones, light pens and position-sensing screen displays may be connected to user interface 640. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 630, fed through data port 660 or typed in using keyboard 645.

In view of the above, the present method embodiments may therefore take the form of computer or controller implemented processes and apparatuses for practicing those processes. The invention can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The invention may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 1-5.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of determining a validity of an estimate of a response time of a brake, comprising:
performing an action that initiates engagement of the brake;
obtaining a waveform of a parameter related to the engagement of the brake;
determining inflection points in the waveform within a selected time period to estimate the response time of the brake; and
providing an indicator when a number of determined inflections points is greater than a selected count value to indicate the validity of the of the estimate.

2. The method of claim 1, wherein determining the inflection points further comprises determining a first derivative of the waveform.

3. The method of claim 2 further comprising comparing the determined first derivative to a selected parameter threshold value.

4. The method of claim 1, wherein the brake is an aircraft brake, further comprising estimating the response of the brake in-situ.

5. The method of claim 1, wherein a first determined inflection point is indicative of initiating the engagement of the brake and a last determined inflection point is indicative of completing engagement of the brake.

6. The method of claim 1, further comprising wherein the provided indicator indicates a need to repeat a test for estimating the response time.

7. The method of claim 1, wherein performing the action further comprises de-energizing a device that maintains the brake in a non-engaged position.

8. The method of claim 1, further comprising measuring the parameter at a frequency of about 1 kilohertz.

9. An apparatus for determining a validity of an estimate of a response time of a brake, comprising:
a sensor configured to obtain measurements of a parameter related to the engagement of the brake;
a processor configured to:
obtain a waveform of the parameter from the obtained parameter measurements,
determine inflection points in the waveform within a selected time period to estimate the response time of the brake, and
provide an indicator when a number of determined inflection points is greater than a selected count value related to the validity of the estimated response time.

10. The apparatus of claim 9, wherein the processor is further configured to determine the inflection points by determining a first derivative of the waveform.

11. The apparatus of claim 10 wherein the processor is further configured to compare the determined first derivative to a selected threshold value.

12. The apparatus of claim 9, wherein a first determined inflection point is indicative of initiating the engagement of the brake and a last determined inflection point is indicative of completing engagement of the brake.

13. The apparatus of claim 9, wherein the processor is further configured to disregard the estimated response time when the number of determined inflection points is greater than the count value.

14. The apparatus of claim 9, wherein the sensors is further configured to obtain the measurements of the parameter at a frequency of about 1 kilohertz.

15. A computer program product, comprising:
a computer readable storage medium having computer readable program code embodied therewith, the computer readable program code comprising instructions, that when executed by a computer, implement a method of determining a validity of an estimate of a response time of an aircraft brake, wherein the method comprises:

performing an action that initiates engagement of the brake;

obtaining a waveform of a parameter related to the engagement of the brake;

determining inflection points in the waveform within a selected time period to estimate the response time of the brake; and providing an indicator when a number of determined inflection points is greater than a selected count value to indicate the validity of the estimate.

16. The computer program product of claim 15, wherein determining the inflection points further comprises determining a first derivative of the waveform.

17. The computer program product of claim 16 wherein the method further comprises comparing the determined first derivative to a selected threshold value.

18. The computer program product of claim 15, wherein a first determined inflection point is indicative of initiating the engagement of the brake and a last determined inflection point is indicative of completing engagement of the brake.

19. The computer program product of claim 15, wherein the provided indicator indicates a need to repeat a test for estimating the response time.

20. The computer program product of claim 15, wherein the method further comprises measuring the parameter at a frequency of about 1 kilohertz.

* * * * *